United States Patent [19]

Jondrow

[11] Patent Number: 5,717,569
[45] Date of Patent: Feb. 10, 1998

[54] EJECTION AND INSULATION JACKET FOR A REMOVABLE COMPONENT IN A PORTABLE COMPUTING DEVICE

[75] Inventor: Timothy J. Jondrow, Corvallis, Oreg.

[73] Assignee: Hewlett-Packard Company, Palo Alto, Calif.

[21] Appl. No.: 579,557

[22] Filed: Dec. 27, 1995

[51] Int. Cl.⁶ .................................. G06F 1/16; H05K 5/03
[52] U.S. Cl. .................................. 361/684; 206/721
[58] Field of Search .................................. 361/683–686, 361/737; 364/708.1; 150/152; 206/320, 720, 721; 229/87.01, 87.04, 103.2; G06F 1/16

[56] References Cited

U.S. PATENT DOCUMENTS

| | | | |
|---|---|---|---|
| 1,193,771 | 12/1916 | Evans | 150/152 |
| 4,845,583 | 7/1989 | Zimmerman et al. | 360/133 |
| 5,060,979 | 10/1991 | Garza | 281/31 |
| 5,435,437 | 7/1995 | Sasaki | 206/320 |
| 5,445,266 | 8/1995 | Prete et al. | 206/320 |
| 5,472,083 | 12/1995 | Robinson et al. | 229/87.01 |

*Primary Examiner*—Leo P. Picard
*Assistant Examiner*—Lynn D. Feild

[57] ABSTRACT

A component jacket for use in a portable computer to facilitate installation and removal of a component, such as a memory drive, and to mechanically insulate the component. The component jacket has a middle section and two flaps which extend from the middle section. The flaps wrap around opposing ends of the component toward one another to form installation and removal tabs. The user pulls the installation tab to install the component and the removal tab to remove the component. The middle section and flaps encompass the component to mechanically insulate the component when installed.

22 Claims, 3 Drawing Sheets

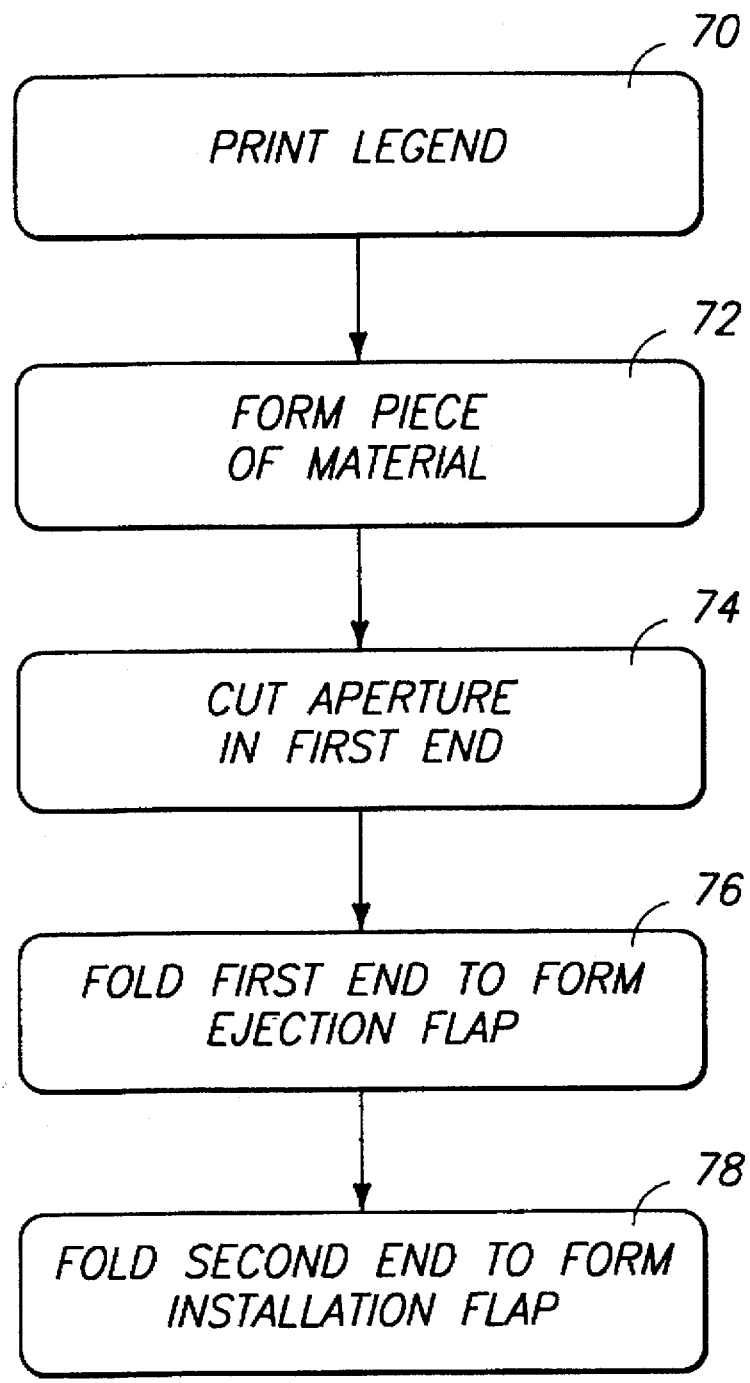

EJECTION AND INSULATION JACKET FOR A REMOVABLE COMPONENT IN A PORTABLE COMPUTING DEVICE

TECHNICAL FIELD

This invention relates to portable computers, and more particularly, to mechanisms for removing and installing components within portable computers.

BACKGROUND OF THE INVENTION

The design trends in computing devices are to construct components that are smaller, lighter, and more powerful. This is particularly the case for portable computing devices, such as laptop computers, notebook computers, sub-notebook computers, and handheld computers. To produce smaller and lighter portable computers, the components are miniaturized and packaged in a compact arrangement with very little space between them. This high density packaging makes assembly more difficult as there is little room to manually maneuver the components.

One particular problem concerns the installation of memory drives in portable computers. Memory drives are often designed to be removable from the portable computers. The removability feature permits easy upgrade to higher capacity memory drives. Additionally, a user can remove the memory drive when not in use for security purposes or to transfer the memory drive to another computer.

In early portable computers, the components were packaged less densely, allowing a person to physically grasp the memory drive with his/her fingers during installation or removal. As packing density increased, leaving little room for human fingers, levers or other movable mechanical gadgets were introduced to facilitate installation and removal of the memory drive. However, manufacturers continue to eliminate unused voids, often leaving insufficient space to accommodate levers or movable mechanical gadgets that assist in handling the memory drive.

Accordingly, there is a need to provide a mechanism which facilitates easy and convenient installation and removal of the memory drive in tight tolerance areas, without use of levers or movable mechanical gadgets.

Another, unrelated problem concerns insulation of the memory drive once it is installed in the portable computer. The memory drive is typically mounted just beneath the keyboard. Due to rigid height requirements, there is very little separation between the keyboard and memory drive. As an example, in some highly compact sub-notebook computers, there may be as little as 0.008" separation between the memory drive and keyboard. With these narrow tolerances, overlying keys may undesirably strike the memory drive if depressed too hard by the user.

Accordingly, there is a need to devise a way to mechanically insulate the memory drive from the keyboard, or other components in the portable computer.

SUMMARY OF THE INVENTION

This invention provides a component jacket for a component, such as a memory drive, which performs the dual functions of facilitating installation and removal of the component, as well as mechanically isolating and electrically insulating the component.

According to one aspect of this invention, a component jacket has a middle section and two end sections or flaps which extend from the middle section. The flaps wrap around opposing ends of the component toward one another to form installation and removal tabs. The flaps and middle section of the jacket effectively encompass the component to form a mechanical insulator between the component and other elements. In one implementation, the jacket is formed of embossed plastic which provides both a dampening cushion isolator and an electrical insulator for the component.

To install the component into a computer, the user orients the component within the dedicated recess with its connector interface facing a compatible connector interface on the computer. The user then pulls the installation tab which wraps around the end opposite to the connector end. The removal tab has an aperture formed therein to expose the connector interface so that it may be coupled to the computer's interface. To remove the component, the user pulls the removal tab to disengage the component from the computer. The user then lifts the component from the dedicated recess using one of the tabs.

According to another aspect of this invention, a method for producing the jacket is described.

BRIEF DESCRIPTION OF THE DRAWINGS

The same reference numerals are used throughout the drawings to reference like components and features.

FIG. 4 is a flow diagram of a method for producing a memory drive jacket.

DETAILED DESCRIPTION OF THE PREFERRED EMBODIMENT

Aspects of the invention are described herein in an example context of a memory drive for a portable laptop computer. However, aspects of this invention can be implemented with other removable components, such as a battery or modem, and in other computing devices where space between components is limited.

Figure 1:
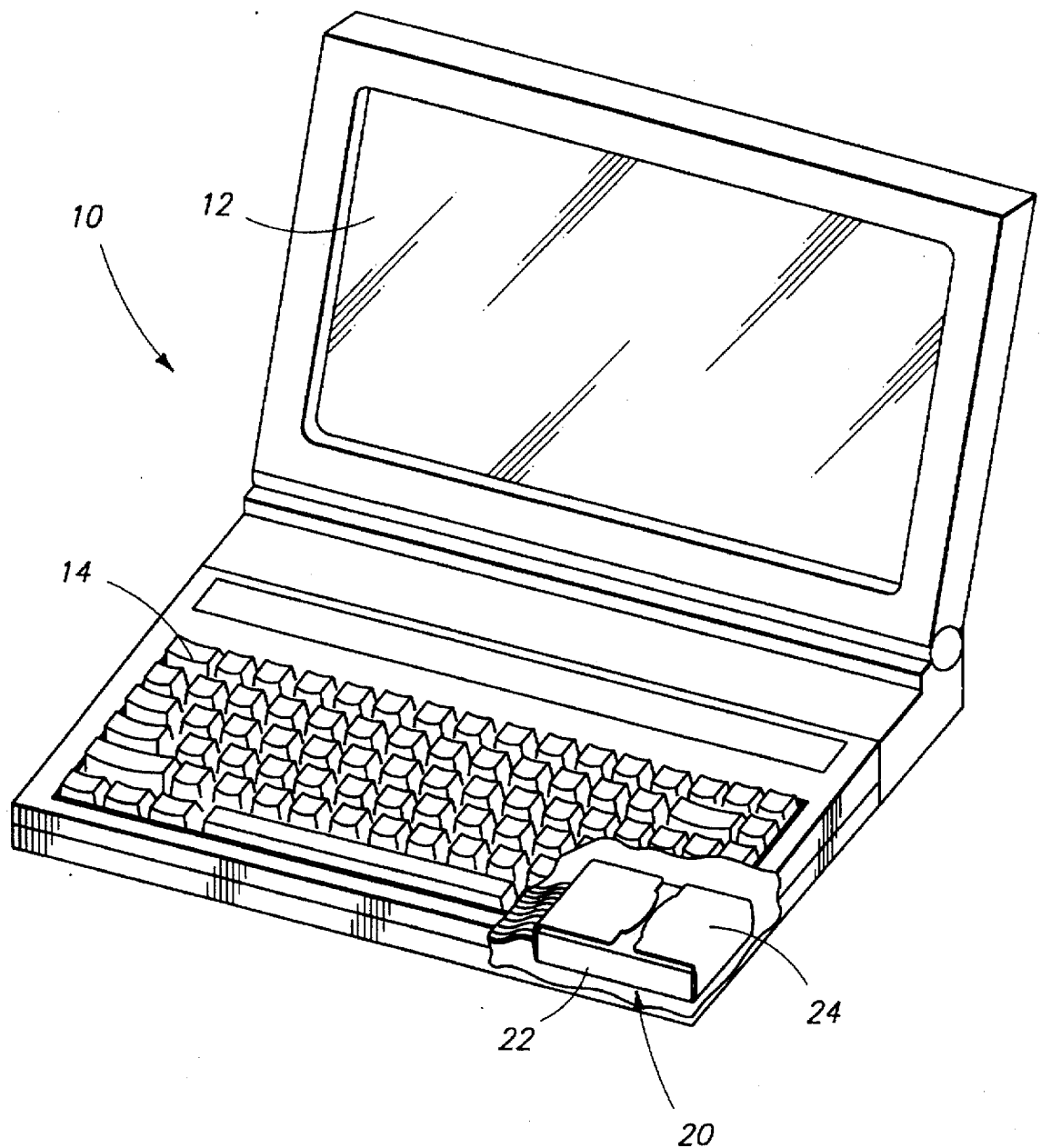
FIG. 1 is a diagrammatic illustration of a portable computing device, with a partial cut away of the keyboard to reveal an installed memory drive.

FIG. 1 shows a portable computing device 10 in the form of a portable laptop computer. The portable laptop computer is illustrated for example purposes, as aspects of this invention can be implemented in other computing devices, including notebook computers, sub-notebook computers, palmtops, or other portable devices with restrictive size requirements. The portable laptop computer 10 has a display 12 and a keyboard 14. A memory drive assembly 20 is mounted within a dedicated memory drive cavity or recess in the computer housing located beneath the keyboard 14.

The memory drive assembly 20 can be accessed in the portable laptop computer 10 by lifting the keyboard to provide a top entry. Alternatively, an access door or panel is provided in the bottom side of the computer housing to provide a bottom entry. In this latter case, the memory drive assembly 20 is turned over so that the installation and ejection flaps of jacket 24 (described below in more detail) are facing the entry opening.

Figure 2:
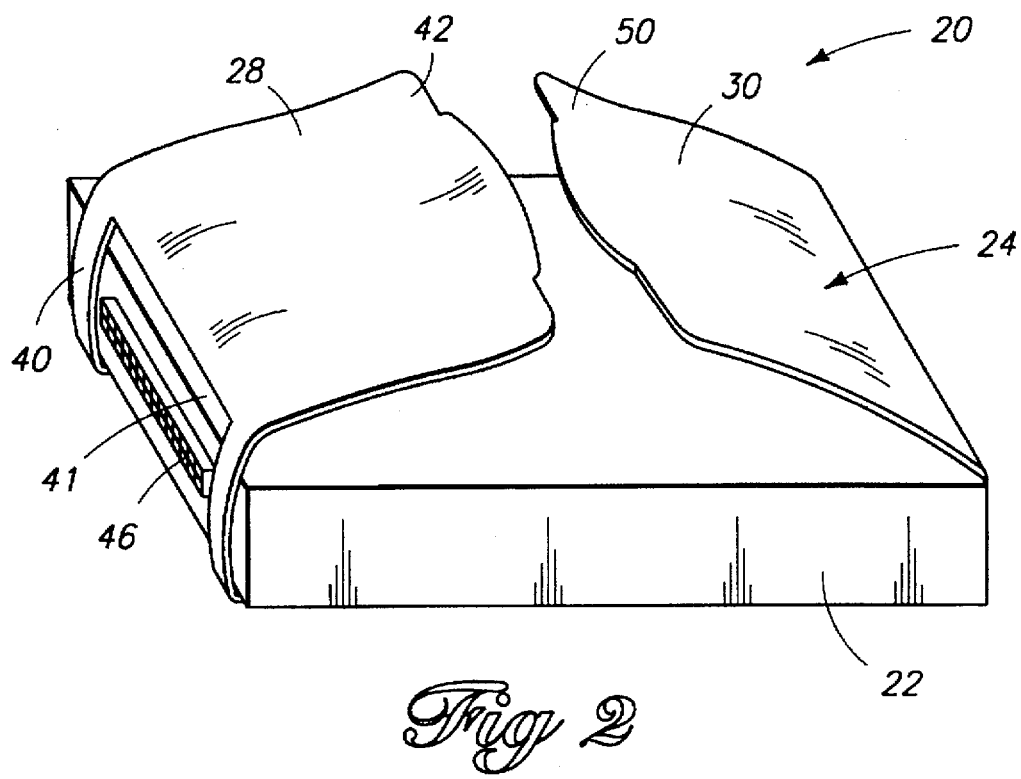
FIG. 2 is a perspective view of a memory drive assembly.

FIG. 2 shows the memory drive assembly 20 in more detail. It includes a memory drive 22 and an ejector jacket 24 which is used alternately to install the memory drive 22 in the portable laptop computer 10 and to eject the drive 22 from the computer 10. In the illustrated implementation, the hard disk drive 22 has a 2.5" form factor. However, other memory drives with different form factors may be employed, including floppy memory drives, optical memory drives, CD ROM drives, and digital video drives.

Figure 3:
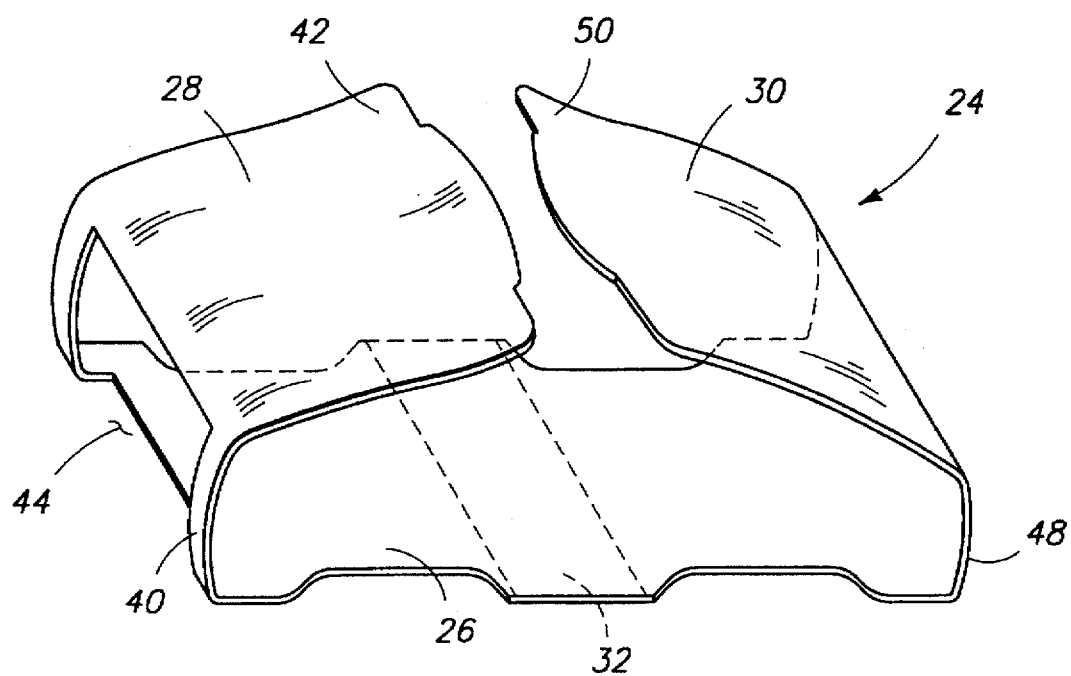
FIG. 3 is a perspective view of a memory drive jacket employed in the FIG. 2 memory drive assembly.

With reference to both FIGS. 2 and 3, the ejector jacket 24 has a middle section 26, a first end section or flap 28, and a second end section or flap 30. The middle section 26 is sized to extend longitudinally across the memory drive 22. In one implementation, an adhesive element 32, or other attaching means, is used to secure the middle section 26 to the computer housing beneath the memory drive. In an alternative implementation, the jacket 24 can be mounted directly to the memory drive 22. In this latter case, the adhesive strip 32 is positioned on the inside surface of the middle section 26 to bond to the memory drive casing.

The first end section 28 has a proximal portion 40 adjacent to the middle section 26 and a distal portion 42. The first end section 28 is folded back on top of the middle section 26 so that the distal portion 42 extends alongside the middle section 26. An aperture 44 is formed the first end section 28 at the proximal portion 40 to expose a connection interface 46 of the memory drive 22.

The second end section 30 has a proximal portion 48 adjacent to the middle section 26 and a distal portion 50 which folds back alongside the middle section 26. The first and second end sections are movable, bendable flaps which define respective ejection and installation tabs for use in removing and installing the memory drive 22. In the illustrated implementation, the first flap 28 wraps around one end of the memory drive so that the distal portion 42 forms an ejection tab used to remove the memory drive 22 from a computer. The second flap 30 wraps around the opposite end of the memory drive so that the distal portion 48 forms an installation tab used to install the memory drive 22 into the computer.

To install the memory drive 22 into the laptop computer 10, the user first locates the memory drive cavity by lifting the keyboard, or by opening an access panel in the bottom of the laptop computer 10. Next, the user orients the memory drive 22 within the dedicated memory drive recess to align the connection interface 46 with a compatible connector interface on the laptop computer. The aperture 44 permits access to the connection interface 46. The user then pulls the installation tab 48 to engage the connectors, thereby electronically coupling the drive to the computer.

To remove the memory drive, the user once again accesses the memory drive cavity to expose the installed memory drive. The user then pulls the ejection tab 42 to disengage the memory drive from the computer and lifts the memory drive from the memory drive recess using one of the tabs. Once a side is lifted, the memory drive can be gasped and handled manually.

For the user's convenience, a legend or symbol can be imprinted on the flaps 28 and 30 to facilitate installation and removal. For instance, a legend stating "PULL TO EJECT, LIFT TO REMOVE" can be imprinted on the ejection tab 42, along with a rightward facing arrow (relative to the illustration) showing the direction to pull. A legend stating "PULL TO INSTALL" with a leftward facing arrow showing the pull direction can similarly be imprinted on the installation tab 48.

The jacket is preferably formed of a single unitary piece of medium to high tensile strength plastic film, such as a polyester film sold under the trademark Mylar™. The jacket effectively encompasses the memory drive 22, thereby protecting and mechanically isolating the memory drive 22. As an option, the tabs 42 and 48 can be thermally embossed to provide greater cushion between the keys in the keyboard and the memory drive. Additionally, the middle section 26 of the jacket acts as an electrical insulating layer which protects the underside of the memory drive, which in some cases might have exposed conductors.

FIG. 4 shows a method for producing the memory drive jacket. First, an appropriate legend is printed on a sheet of material (step 70). Next, a piece of the material having a length greater than a length of the memory drive is formed (step 72). This is preferably accomplished by stamping out an elongated piece of plastic film from a sheet of plastic. An aperture is then cut in a first end portion of the piece of material (step 74). This aperture will be used to expose the connection pins of the memory drive. It is noted that steps 72 and 74 can be performed concurrently, whereby the same stamping action is used to simultaneously form the elongated piece of material and to cut the aperture from the piece of material.

The first end section is folded back to lie alongside the middle section (step 76). The folded first end section has sufficient length to wrap around an end of the memory drive to define the ejection tab. The fold positions the aperture at the end of the jacket to overlie the connection interface of the memory drive. The second end section is likewise folded back toward the first flap to also lie alongside the middle section to define the second flap or installation tab (step 78). The second flap has sufficient length to wrap around an opposing end of the memory drive. It is noted that steps 76 and 78 can be reversed, or more preferably, performed simultaneously through a molding device that concurrently forms the fold lines in the piece of material.

Folding the two end sections leaves a middle section between the first and second flaps. The middle section has a length approximating the length of the memory drive. An adhesive strip is then secured to the middle section.

The component jacket is advantageous in that it facilitates easy and convenient installation and removal of the component, such as the memory drive, in tight tolerance areas within a portable computer, without use of levers or movable mechanical gadgets. The thin film jacket consumes very little space, allowing tighter tolerance packaging. Additionally, the film performs a dual function of mechanically insulating the memory drive.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. A component jacket for installation and removal of a component in a computing device, comprising:

a middle section;

a first end section at a first end of the middle section, the first end section having a proximal portion adjacent to the middle section and a distal portion, the first end section being folded so that the distal portion extends alongside the middle section;

a second end section at a second end of the middle section, the second end section having a proximal portion adjacent to the middle section and a distal portion, the second end section being folded so that the distal portion of the second end section extends alongside the middle section; and the distal portions of the first and second end sections extending toward one another during installation and removal so that the distal portion of the first end section is pulled in a direction toward the second end section for installation and the distal portion of the second end section is pulled in a direction toward the first end section for removal.

2. A component jacket as recited in claim 1, wherein the proximal portion of the first end section has an aperture formed therein.

3. A component jacket as recited in claim 1, wherein the middle section, first end section, and the second end section are formed of a single, unitary piece of material.

4. A component jacket as recited in claim 1, wherein the middle section, first end section, and the second end section are formed of plastic.

5. A component jacket as recited in claim 1, wherein the middle section, first end section, and the second end section are formed of a single, unitary piece of plastic.

6. A component jacket as recited in claim 1, wherein the first and second end sections are formed of an embossed material that acts as a mechanical isolator.

7. A component jacket as recited in claim 1, wherein the middle section is formed of a material that acts as an electrical insulator for the component.

8. A component jacket as recited in claim 1, further comprising an adhesive element attached to the middle section.

9. A portable computing device incorporating a component jacket as recited in claim 1.

10. A component assembly comprising:

a component;

an ejector jacket to eject and install the component, the ejector jacket having first and second flaps;

the first flap extending from a first end of the component in a direction that enables a user to pull the first flap to eject the component; and the second flap extending from a second end of the component in a direction that enables the user to pull the second flap to install the component.

11. A component assembly as recited in claim 10 wherein the component comprises a memory drive.

12. A component assembly as recited in claim 10 wherein the first and second flaps extend toward one another alongside the component.

13. A component assembly as recited in claim 10 wherein the ejector jacket encompasses the component to mechanically insulate the component.

14. A component assembly as recited in claim 10 wherein:

the component has a connector interface at the first end thereof; and the first flap has an aperture formed therein to expose the connector interface.

15. A component assembly as recited in claim 10 wherein the ejector jacket is formed of plastic.

16. A component assembly as recited in claim 10, further comprising means for attaching the ejector jacket to the component.

17. A portable computing device incorporating a component assembly as recited in claim 10.

18. A computing device comprising:

a housing which defines a component cavity;

a component installed in the component cavity of the housing, the component being removable from the component cavity;

an ejector jacket having a middle section mounted beneath the component, the ejector jacket also having first and second movable flaps;

the first flap wrapping around a first end of the component to define an ejection tab that enables a user to pull the ejection tab to eject the component from the computing device; and the second flap wrapping around a second end of the component to define an installation tab that enables the user to pull the installation tab to install the component into the computing device.

19. A computing device as recited in claim 18 wherein the ejector jacket is secured to the housing within the component cavity.

20. A method for forming a component jacket for use in installing and removing a component from a computing device, the method comprising the following steps:

providing dimensions of a component including a component length and a component thickness;

forming a piece of material having a length greater than the component length;

folding a first end of the piece to define a first flap having a length greater than the component thickness;

folding a second end of the piece to define a second flap having a length greater than the component thickness;

said folding steps leaving a middle section between the first and second flaps of a length approximating the component length; and applying at least one of (1) a first label to the first flap indicating that the first flap be pulled toward the second flap for installation or (2) a second label to the second flap indicating that the second flap be pulled toward the first flap for removal.

21. A method as recited in claim 20 wherein said folding steps comprise bending the first and second ends back toward one another to lie alongside the middle section.

22. A method as recited in claim 20 further comprising the step of attaching an adhesive element to the middle section.

\* \* \* \* \*